April 15, 1930.  J. E. TITION  1,755,038
METHOD OF MAKING MOLDS
Filed May 12, 1928
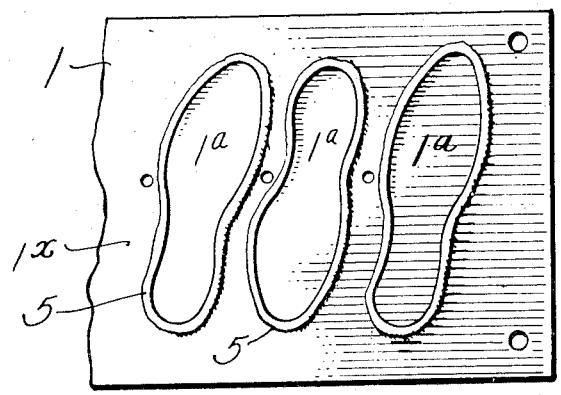
Fig. 1.
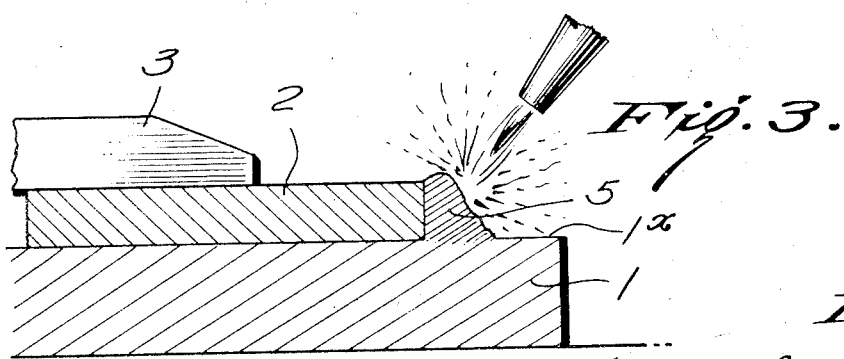
Fig. 3.
Fig. 2.
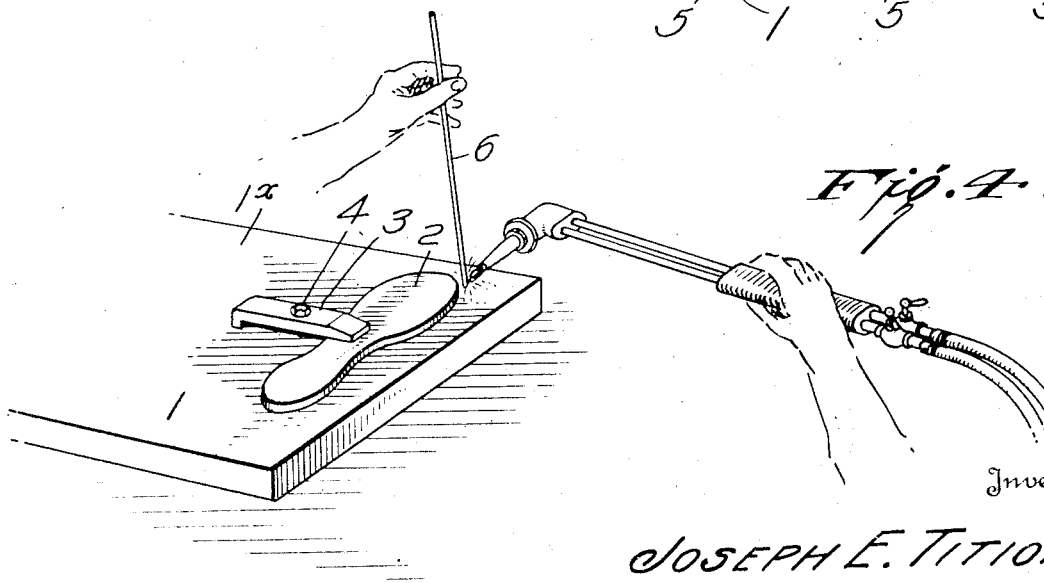
Fig. 4.
Inventor
JOSEPH E. TITION,
By Sperr Middleton Donaldson & Hall
Attorneys Patented Apr. 15, 1930

1,755,038

UNITED STATES PATENT OFFICE

JOSEPH E. TITION, OF KENMORE, OHIO, ASSIGNOR TO THE MILLER RUBBER CO., OF AKRON, OHIO

METHOD OF MAKING MOLDS

Application filed May 12, 1928. Serial No. 277,351.

The said invention relates to an improved method of forming metal articles, and is designed more particularly for making molds such as are largely used in producing vulcanized rubber articles, though not limited to this particular type of article. For convenience of illustration and description I have selected a mold such as used for producing vulcanized rubber soles as a typical embodiment of the invention.

The invention aims to provide a method by which such molds, and other articles may be much more expeditiously and economically manufactured, with a great saving in labor and the elimination of expensive machinery heretofore found necessary, and the invention comprises the novel method hereinafter described and defined by the appended claims.

In order that the invention may be more readily understood reference is made to the accompanying drawings in which:

Fig. 1 is a plan view of a mold plate, partly broken away.

Fig. 2 is a transverse section thereof.

Fig. 3 is an enlarged sectional view partly broken away, and

Fig. 4 is a perspective view illustrating my method of procedure.

As is well known to those skilled in the art it is customary in sole molding to provide a mold having a considerable number of mold cavities therein, such mold being of a size to completely fill the space between the platens of the vulcanizing press. Such molds comprise a mold plate 1 having mold cavities $1^a$ and a closure plate which is not shown, being merely a plane surfaced plate.

To make sure of the mold cavities being completely filled it is customary to place a slight excess of rubber compound in each cavity, and overflow spaces or cavities must be provided for the material which is squeezed out under the action of the press platen on the closure plate in closing the mold.

All surfaces which come in contact with the rubber must be accurately machined and have smooth surfaces, which has precluded the formation of the molds by casting.

Heretofore, so far as I am aware, the customary method of making such molds has been to first remove from a solid steel plate such as 1 the portions necessary to form the cavities $1^a$, a hardened steel template being usually clamped to the plate to guide the routing tool which is worked down into the mold plate to the proper depth.

After all the cavities are thus produced the portions of the plate surrounding the cavities are routed away as indicated at $1^c$, leaving upstanding flanges or ribs $1^b$ which define the mold cavities. Thereafter the cavities are finished by filing and scraping until they have the proper dimensions and finish. All this requires a great deal of skilled work and expensive machinery which is avoided by the present method.

In proceeding according to my present invention and using the sole mold above referred to as a convenient illustration of method, I provide the base plate 1 having a properly machined and plane upper surface $1^x$, and of a size corresponding to the requirements of the case, which plate is preferably made of steel. To this plate I temporarily clamp in any suitable manner, as for example, by removable clamp 3 and bolt 4 tapped into the plate, a suitable form, template, or matrix 2, having the desired outline of the article to be produced. This matrix is made of a material having a high heat conductivity and high fusing temperature, copper being found very desirable for this purpose. While the matrix is thus clamped in position as indicated in Fig. 4, I proceed to build up a wall of iron by means of autogenous welding by fusing metal in proximity to the edge of the matrix, thereby flowing or puddling it onto the base plate and welding it thereto, this process being carried on until a wall such as 5 is built up completely around the edge of the template, which wall is preferably built up to a point higher than the top surface of the matrix. Thereafter the matrix is removed and successively clamped in a second position in spaced relation to the wall just made, whereafter the operation is repeated to build up a second wall, and subsequently the process is repeated to build up a third wall as indicated in Fig. 1, further repetition of the process being made until the entire surface of the plate is covered with walls in spaced relation. After all of these walls have been so formed and the plate completely cooled, it may be placed in a suitable grinding or planing machine, and the top edges of the walls ground or planed down to provide smooth upper edges, which in the case of a mold of the type shown would be parallel to the base plate 1, as shown in Fig. 2.

The matrix is preferably made slightly thicker than the desired cavity which ensures the wall 5 being deeper than required, and affords the requisite excess of the material in the wall to provide for the grinding down above referred to. The matrix, being made of a material which is of higher heat conductivity than the base plate, rapidly conducts heat away while the surface of the plate 1 is brought to a welding heat. The heat causes the matrix to expand, the matrix being made smaller than the desired size of the cavity to compensate for this expansion. When the wall 5 has been completed around the matrix and the parts allowed to cool the matrix will shrink away from the wall 5 and can be easily removed from the cavity formed thereby upon removal of the clamp. After all of the cavities have been formed the inner faces of the walls 5, i. e., the faces which define the mold cavities may be smoothed up to take out any roughness, which is a simple operation, the bottom of the cavity, being the upper finished surface of the steel plate, needing no further work. The outer wall faces which define the channels 1ᶜ, which are merely overflow channels, need no finishing as any roughness in these walls is immaterial.

The fusing and welding may be performed by holding the end of a rod 6 in juxtaposition to the edge of the matrix 2, and subjecting it to the action of an oxyacetylene blow torch of the ordinary type as conventionally shown in Fig. 4. While I have shown the oxyacetylene torch as a convenient means of effecting the fusing and welding I do not limit myself in this respect.

Having thus described my invention, what I claim is:

1. The herein described process of building up metal articles which consists in temporarily securing a suitable matrix to a metal base member, fusing and welding additional metal to build up a body of metal adjacent said matrix, and thereafter removing the matrix.

2. The herein described method of building up metal articles which consists in temporarily securing to a metal base a suitable form of material having a higher coefficient of expansion than the base, fusing and welding additional metal of the same character as the base to said base in juxtaposition to the form to build up a wall around the form, and thereafter removing the form.

3. The herein described method of building up metal articles which consists in temporarily securing to a metal base a form of material having a higher heat conductivity than the base and a high fusing temperature, fusing and welding additional metal of the same character as the base in juxtaposition to the form to build up around said form a wall integrally united to the base, and removing the form.

4. The herein described method which consists in preparing a base plate with a plane and finished surface, temporarily clamping to said base a matrix of material different from said base, fusing and welding additional metal to said base in juxtaposition to said matrix to build up a wall adjacent said matrix which is homogeneously united to said base, removing the matrix, and thereafter evening up the top of said wall to bring all portions thereof into parallelism with the base.

5. The herein described method of forming molds having a plurality of mold cavities which consists in preparing a base plate with a plane and finished surface, temporarily clamping to said plate a form of material non-weldable thereto, fusing and welding to said base, in juxtaposition to the entire edge thereof, metal which is weldable to the base to build up a wall around said base, removing the form and clamping it onto the base in spaced relation to said wall, repeating the fusing and welding operation to build up another wall in spaced relation to said first named wall to provide a channel between adjacent portions of said walls.

6. The herein described method of forming molds having a plurality of mold cavities which consists in preparing a base plate with a plane and finished surface, temporarily clamping to said plate a form of material non-weldable thereto, fusing and welding to said base, in juxtaposition to the entire edge thereof, metal which is weldable to the base to build up a wall around said base, removing the form and clamping it into the base in spaced relation to said wall, repeating the fusing and welding operation to build up another wall in spaced relation to said first named wall to provide a channel between adjacent portions of said walls, and evening up the tops of said walls to bring all portions thereof into a plane parallel to said base plate.

7. The herein described method of forming plural cavity molds, which consists in providing a metal base plate having a finished surface, and successively building up on said base plate cavity forming walls by fusing and welding metal to said base plate in juxtaposition to the edges of one or more forms.

8. The herein described process of building up metal articles of uniform composition throughout, which consists in temporarily securing a matrix to a metal base member, fusing and welding to said base member about said matrix additional metal of the same character as the base member, and thereafter removing the matrix.

9. The herein described method of making a mold having a mold cavity in the surface thereof, which consists in preparing a base plate having a plain finished surface, temporarily affixing thereto a matrix of non-weldable material, fusing and welding to said base plate, in juxtaposition to the edge of said matrix, metal which is weldable to said base to build up a wall adjacent said edge and thereafter removing the matrix.

In testimony whereof I affix my signature.

JOSEPH E. TITION.